Figure 1:
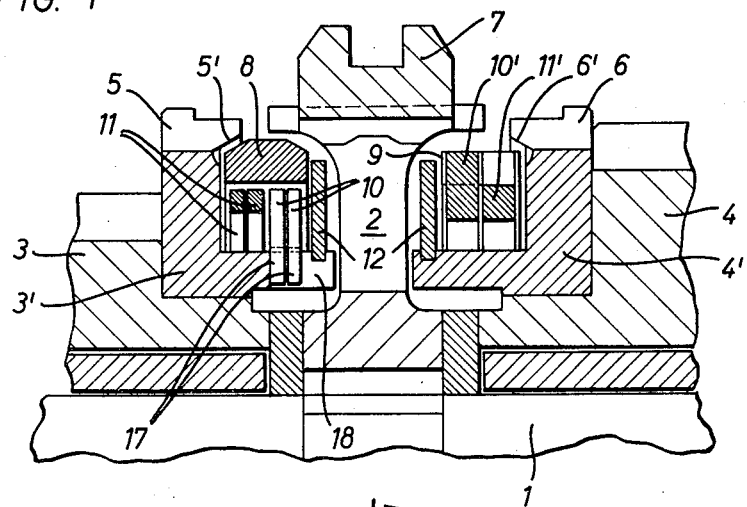

Dec. 21, 1965  R. BOGUSLAWSKI ETAL  3,224,534
SYNCHRONIZING ARRANGEMENT
Filed March 10, 1964  2 Sheets-Sheet 1

INVENTORS
Rudolf Boguslawski
Josef Brandl
By: Dicke & Craig
ATTORNEYS

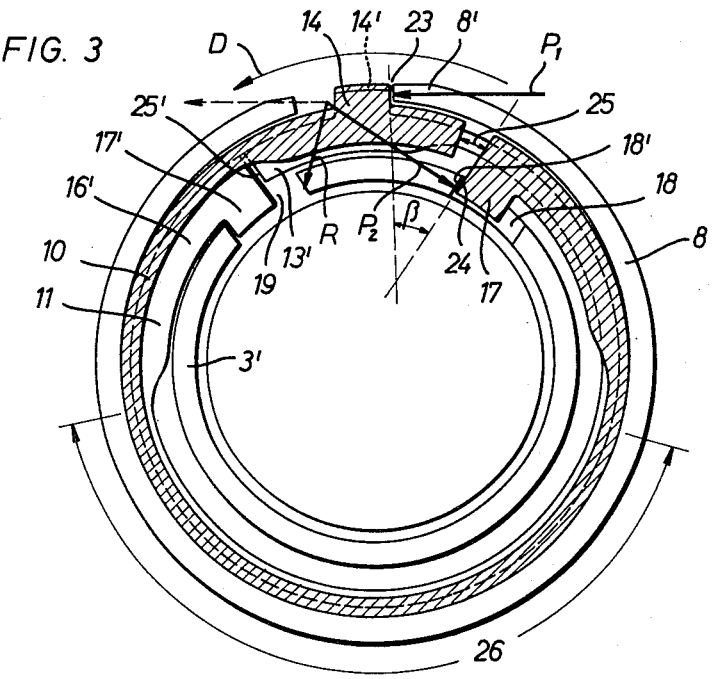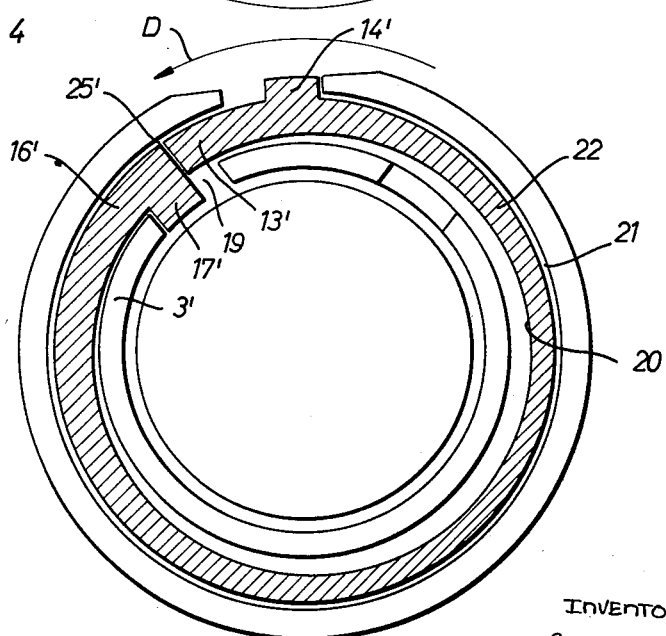

United States Patent Office 3,224,534
Patented Dec. 21, 1965

3,224,534
SYNCHRONIZING ARRANGEMENT
Rudolf Boguslawski and Josef Brandl, Munich, Germany, assignors to Bayerische Motoren Werke Aktiengesellschaft, Munich, Germany
Filed Mar. 10, 1964, Ser. No. 350,712
Claims priority, application Germany, Mar. 13, 1963, B 71,099
17 Claims. (Cl. 192—53)

The present invention relates to a synchronizing installation for gear-type change-speed transmissions, especially for motor vehicles, provided with a slotted friction ring, within which is arranged a unitary slotted expanding ring increasing the servo effect thereof and extending substantially over the entire length of the friction ring, the end regions of the expanding ring in the operating position thereof abutting directly, on the one hand, against the end of the friction ring pointing in the direction of rotation and, on the other, against an oppositely directed abutment surface of a hub supporting the synchronization installation.

Known in the prior art is a synchronization installation of this type of construction with an expanding ring constructed as tensioning band the end regions of which axially overlap adjacent one another. Both end regions each carry abutments rigidly secured inwardly and outwardly thereof and provided with parallel abutment surfaces. Depending upon the direction of rotation, one of the inner abutments, namely the abutment disposed forwardly at the tensioning band in the direction of rotation abuts against one of the two approximately radial and parallel boundary surfaces of a recess provided within the hub carrying the synchronization installation. The outer abutment disposed rearwardly at the tensioning band in the direction of rotation serves for the support of the end of the friction ring pointing in the direction of rotation. During the initiation of the synchronization operation, the friction ring is at first rotated in the direction of rotation to such an extent until the end thereof pointing in the direction of rotation abuts against the outer abutment of the end of the tensioning band which points opposite the direction of rotation. Upon the further rotation of the friction ring, the tensioning band is thereupon expanded by entrainment of the outer abutment thereof and immediately comes into abutment against the inner surface of the friction ring over the entire length thereof. The end of the tensioning band pointing in the direction of rotation is thereby supported against the hub with the inner abutment thereof. The tensioning band produces during its expansion radially outwardly acting forces distributed approximately uniformly over the entire circumference thereof which result in a very high blocking effect of the friction ring against the sliding movement of a coupling sleeve. This blocking effect is so large that oftentimes automatic jamming or self-blocking occurs and the shifting of the coupling members under synchronism cannot be carried out or can be carried out only with very large shifting forces. A further disadvantage of this type of prior art construction is the difficulty to construct the abutments integral with the tensioning band or to fasten these abutments securely and permanently at the tensioning band. By reason of these shortcomings, this type of construction could not be constructed heretofore in such a manner as to enable exploitation thereof in practice notwithstanding its simple structure from an overall point of view and its high blocking effect.

The present invention eliminates these shortcomings by such a design and construction of the type of structure described hereinabove that the end regions of the expanding ring are provided with abutment surfaces the planes of which subtend with each other such an angle that the abutment forces acting at the expanding ring have an inwardly directed resultant. In this manner, during initiation of the synchronization operation, the expanding ring is brought at first into abutment under the effect of the resultant force of the abutment forces at the friction ring within the area opposite the slot aperture thereof. During the further rotation of the friction ring, the expanding ring is then increasingly expanded and comes more and more into contact in a pressure-force-transmitting manner in both directions with the inner surfaces of the friction ring. The ends of the friction ring thereby remain free from an assistance by the expanding ring and thus maintain their possibility of deflection or deviation in the inward direction, whereby the sliding over of a coupling sleeve is facilitated after attained synchronism. With particularly high synchronization work, the expanding ring comes into contact also with the construction of the present invention over the entire length thereof with the inner surface of the friction ring. The elastic return force of the expanding ring becomes thereby so large that a self-blocking of the synchronization installation is prevented also in this case.

A synchronization installation has already been proposed heretofore in which a unitary expanding ring carries at both ends abutment surfaces the planes of which subtend an angle open radially outwardly whereby the support or abutment forces acting thereon have a radially inwardly directed resultant. However, this prior art construction includes at least one separate intermediate member arranged between the ends of the expanding ring which brings into connection the ends of the expanding ring with the ends of the friction ring. The angular position of the abutment surfaces results automatically with this type of construction having radial separating surfaces between expanding ring and intermediate member.

According to a still further feature of the present invention, the expanding ring is provided at both end regions thereof with one single abutment surface for each direction of rotation, which becomes effective only during the respective rotation and of which one enters into connection exclusively with the friction ring and the other exclusively with the hub. As a result thereof, the expanding ring is expanded only in one direction of rotation and acts against the inner surface of the friction ring during such direction of rotation, whereas it is compressed in the other direction of rotation. This construction is particularly suited for use with the starting speed or transmission ratio or with the highest speed of a gear-type change-speed transmission in which a synchronization operation is necessary or desirable only in one direction of rotation. Upon engagement of the starting speed while the vehicle stands still the undesirable and bothersome blocking of the shifting operation is prevented.

Advantageous is the arrangement of the two abutment surfaces on the expanding ring, on the one hand, at an inwardly directed nose portion which engages into an aperture or recess of the hub and, on the other, at an outwardly directed nose portion which extends through the slot aperture of the friction ring.

A further characteristic and feature of the present invention essentially resides in that the slotted expanding ring has a varying cross section over its circumference. The expansion of the expanding ring can be controlled thereby so that the expanding ring comes into abutment against the inner surface of the friction ring more quickly and more strongly in one direction.

While it is known already to construct an endless rigid expanding ring provided with diametrically opposite abutments with a cross section continuously varying between these abutments, whereby the inner and outer boundary surfaces thereof, apart from the two abutments, are formed by two circles disposed eccentrically to one another, this type of change in cross section, however, has no influence on the effect of the synchronization installation but serves exclusively for the better spatial utilization of the eccentric annular space remaining within the friction ring up to the hub since the friction ring has a continuously varying cross section though varying in a direction opposite to the expanding ring.

It is advantageous for the space-saving construction of the synchronization installation that the expanding ring be provided with a flat cross section the long cross sectional axis of which is disposed within the plane determined by the annular surface. The expanding ring thereby obtains a thickness remaining the same with varying cross section and according to a further feature of the present invention can be manufactured by a simple punching operation. A particularly inexpensive construction of the synchronization installation results therefrom. This construction has additionally also functional advantages, for the expanding ring possesses thereby a high return spring force which favors, upon attaining synchronism, the decrease of the blocking effect and opposes a self-blocking action. With the use of thin sheet metal material, several identical expanding rings are arranged axially adjacent one another so that the abutment surfaces receive a sufficient size for the transmission of the abutment forces. It is possible though not recommended by reason of the additionally required operation to connect these expanding rings with one another, for example, by spot welding, hard soldering or the like.

In order to constitute the synchronization installation having expanding rings operable in one direction for both directions of rotation, according to a further feature of the present invention at least two identical expanding rings are arranged alternately of which each group comes into operation during one direction of rotation. If these alternately arranged expanding rings are connected with one another, for example, in a pair-wise manner, then the elasticity of all expanding rings may be utilized for the control of the expanding operation. Generally, however, it is sufficient when a part, respectively, of the rings is effective only for one direction of rotation. With this construction the hub is provided with two apertures offset in the direction of rotation into which engages an inwardly directed nose portion of those expanding rings which act in a given direction of rotation. The outwardly directed nose portions of all expanding rings extend between the slot aperture of the friction ring. The distance of the apertures in the hub portion may be utilized also for the control of the operation of the expanding rings since with an increasing distance the angle between the abutment surfaces of the expanding ring to the hub and to the friction ring increases and simultaneously the bending length of the expanding ring becomes smaller so that the elasticity thereof decreases.

For purposes of limiting the expansion of the expanding ring, according to a still further feature of the present invention with an alternate arrangement of at least two expanding rings, the slot aperture of each expanding ring is limited to a width which permits a compression of the one expanding ring by an angle of rotation which corresponds to a maximum permissive expansion of a second alternately arranged expanding ring. The first expanding ring is thereby deformed into a rigid closed annular body, and more particularly in the operating position of the synchronization installation, in which the expanding ring has reached a dimension that corresponds to the maximum permissive expansion of the friction ring. This dimension is matched advantageously to the position of the friction ring in its rest position determined at the hub portion. The friction ring is therefore expanded by the expanding ring at the most to its rest position which it also seeks to assume by its inherent residual stress.

Accordingly, it is an object of the present invention to provide a synchronization installation for gear-type change-speed transmissions which obviates by simple means the aforementioned shortcomings and drawbacks encountered with the prior art constructions.

It is another object of the present invention to provide a synchronization installation of the type described hereinabove which effectively prevents self-blocking of the synchronization installation that might impair the shifting operation.

Still another object of the present invention resides in the provision of a synchronization installation for change-speed transmissions which, though providing reliable synchronization, facilitates the shifting operation once synchronism is reached.

Still a further object of the present invention resides in the provision of a synchronization installation of the type described which assures the advantages and objects mentioned above yet permits simple structural parts, easy to manufacture and assemble with relatively long life in operation and without danger of damage to mechanical connections or the like.

Another object of the present invention resides in the provision of a synchronization installation of the type described above in which the ends of the friction ring are left free from the servo effect of the expanding ring thereby assuring reliable engagement of the desired speed after attaining synchronism.

Still a further object of the present invention resides in the provision of a synchronization installation for motor vehicles which utilizes a minimum of separate parts that are so constructed and arranged that each part can readily perform its assigned function.

A further object of the present invention resides in the provision of a synchronization installation of the type described hereinabove which is particularly suitable for motor vehicle change-speed transmissions as it can be constructed in such a manner that the synchronization for any speed be operable only in a single direction of rotation.

Still a further object of the present invention resides in the provision of a synchronization installation which completely eliminates the danger of blocking when engaging the first speed of the change-speed transmission while the vehicle stands still.

Still another object of the present invention resides in the provision of a synchronization installation of the type described hereinabove in which the expansion of the friction ring can be readily controlled.

Figure 2:
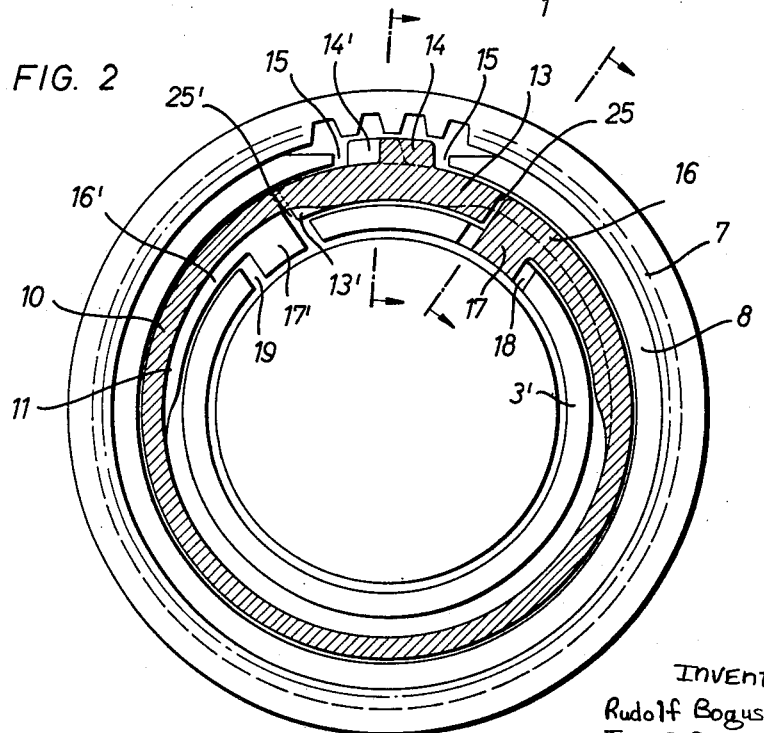

These and other objects, features and advantages of the present invention will become more obvious from the following description when taken in connection with the accompanying drawing which shows, for purposes of illustration only, two embodiments in accordance with the present invention and wherein FIGURE 1 is a partial longitudinal cross sectional view through a motor vehicle change-speed transmission provided with a synchronization installation according to the present invention, FIGURE 2 is a transverse cross sectional view through the synchronization installation of FIGURE 1 in the rest position thereof, FIGURE 3 is a cross sectional view similar to FIGURE 2 through the synchronization installation of FIGURE 1 in the operating position thereof, and FIGURE 4 is a cross sectional view through a modified embodiment of a synchronization installation according to FIGURE 1 in the working position thereof with only one expanding ring in the non-blocking condition.

Referring now to the drawing wherein like reference numerals are used throughout the various views to designate like parts, and more particularly to FIGURE 1, this figure illustrates a part of a motor vehicle change-speed transmission comprising a shaft 1 on which are freely rotatably supported, to both sides of the hub portion 2, one gear 3, 4 each. The hub portion 2, in contrast, is rigidly connected with the shaft 1 for rotation in unison therewith. Claw teeth 5 and 6 are arranged at the gears 3 and 4. The teeth 5, 6 are provided for engagement with the internal teeth of a shifting sleeve 7 which is arranged to rotate in unison with the hub portion 2 but is slidable longitudinally with respect thereto. In order to permit coupling engagement of the shifting sleeve 7 only during synchronism thereof with the gear 3 or 4 to be engaged, i.e., with the claw teeth 5 or 6 thereof, synchronization installations are operatively associated with or coordinated to the gears 3 and 4. These synchronization installations each consist of pre-stressed slotted friction rings 8 and 9 as well as of expanding rings 10, 11 and 10', 11' arranged within the friction rings 8 and 9 for the reinforcement of the expanding action of the respective friction ring. A locking ring 12 as well as a recess 5', 6' at the claw teeth 5, 6 retain the parts of the synchronization installation on the gears 3, 4.

In FIGURE 1, four thin expanding rings 10 and 11 are provided in the left part of the synchronization installation whereas in the right part two expanding rings 10', 11' of double thickness are installed into the corresponding synchronization installation. It is understood, however, that both sides may be of identical construction either with the thin or relatively thick expanding rings. One half 10 or 10' of the identically constructed expanding rings on one side is thereby arranged alternately with respect to the second half 11 or 11' thereof. This can be readily seen from FIGURE 2. The exposed expanding ring 10, shown hatched therein, carries along the outside of the end region 13 thereof pointing in the clockwise direction an outwardly directed nose portion 14 that engages between the slot aperture 15 of the friction ring 8. The expanding ring 10 is provided at the oppositely directed end region 16 with an inwardly directed nose portion 17 that engages into an aperture 18 within an axial extension of the hub portion 3' of the claw teeth 5. The alternately arranged expanding ring 11 disposed therebelow in FIGURES 2 and 3 engages with a nose portion 14' arranged in the end region 13' pointing in a counterclockwise direction into the slot aperture 15 of the friction ring 8. However, the inwardly directed nose portion 17' arranged at the end region 16' and pointing in the clockwise direction engages into a second aperture or recess 19 of the hub portion 3'. The aperture 18 into which engage the two upper expanding rings 10 has a lesser axial depth than the aperture 19. The expanding rings 10, 11, 10', 11' have over the circumference thereof a uniform thickness as seen in the plane of the annular surface thereof. The thin expanding rings 10, 11 and possibly also the expanding rings 10' and 11' may be made in one operation by punching the same out of sheet metal plates. Possibly, a heat treatment is still necessary subsequently for the realization of a sufficient rigidity or elasticity. The width of the expanding rings 10 and 11 is constructed, as shown in FIGURES 2 and 3, substantially constant over the circumference thereof. A larger width may be provided in the end regions 13 and 16 for purposes of reinforcement. According to FIGURE 4, however, the width may be constructed so as to vary over the entire circumference and more particularly, for example, by an eccentric arrangement of the inner and outer circularly shaped boundary lines 20, 21 of a modified expanded ring 22.

*Operation*

The operation of the synchronization installation in accordance with the present invention is as follows:

During initiation of a shifting operation by means of the shifting sleeve 7 with a direction of rotation assumed to be in FIGURE 3, for example, in the direction of the arrow D, the shifting sleeve 7, as a result of the axial movement thereof, at first comes into contact with the corresponding friction ring 8. The friction ring 8 is taken along in the direction of rotation and abuts with the end 8' thereof pointing in the direction of rotation against the abutment surface 23 of the nose portion 14 of the expanding ring 10. The expanding ring 10 is then taken along in the direction of rotation D until the nose portion 17 thereof abuts with its abutment surface 24 against the boundary surface 18' of the aperture 18. The now occurring abutment forces $P_1$ and $P_2$ produce by reason of the inclination of the abutment surfaces 23 and 24 with respect to one another by an angle $\beta$ an inwardly directed resultant force R, which at first displaces the expanding ring 10 in its direction until the expanding ring 10 abuts against the friction ring 8 approximately within the area opposite the slot aperture 25. Upon the further rotation of the friction ring 8, the expanding ring 10 is expanded and abuts more and more in both directions progressively against the inside of the friction ring 8. In FIGURE 3 this abutment is illustrated over the entire range 26 which corresponds nearly to half the circumference of the friction ring 8. The ends of the friction ring 8, however, still have a possibility of movement toward the inside so that the friction ring 8 after achieved synchronism can be compressed from the ends thereof by the shifting sleeve 7 and no self-blocking of the synchronization installation occurs.

The alternately arranged expanding ring 11 disposed behind the illustrated expanding ring 10 in FIGURES 2 and 3 is compressed during this operation. The slot aperture 25' thereby changes more and more by decreasing the width thereof until the end regions 13', 16' abut against one another. In addition to the showing of FIGURE 3, this is clearly visible also particularly from FIGURE 4 in which the expanding ring 22 is illustrated in this end position. If according to FIGURE 3 the expanding ring 11 has reached this end position, then the friction ring 8 has also brought the expanding ring 10 into its largest opening position and the expansion of the friction ring 8 has thereby reached its maximum value. This maximum value may be predetermined in a simple manner by the width of the slot aperture 25'. Of significance are thereby also the dimensions of the apertures 18 and 19 within the hub portion 3' as well as the nose portions 14, 14', 17 and 17' at the expanding rings 10, 11.

While we have shown and described two embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. A synchronization installation for change-speed transmissions, especially for motor vehicles, having a hub portion supporting thereon the synchronization installation, comprising:

slotted friction ring means, unitary slotted expanding ring means arranged within said friction ring means to increase the servo effect thereof and extending approximately over the entire length of said friction ring means, said expanding ring means having end regions which, in the operating position thereof, abut directly, on the one hand, against the end of said friction ring means pointing in the direction of rotation, and, on the other, against an abutment surface provided in said hub portion said abutment surface facing in the direction opposite to said first-named direction, the end regions of said expanding ring means being provided with abutment surface means, the planes of which subtend with one another such an angle that the abutment forces acting against said expanding ring means have an inwardly directed resultant.

2. A synchronization installation for change-speed transmissions, especially for motor vehicles, having a hub portion supporting thereon the synchronization installation, comprising:
  slotted friction ring means,
    unitary slotted expanding ring means arranged within said friction ring means to increase the servo effect thereof and extending approximately over the entire length of said friction ring means,
    said expanding ring means having end regions which, in the operating position thereof, abut directly, on the one hand, against the end of said friction ring means pointing in the direction of rotation and, on the other, against an abutment surface provided in said hub portion, said abutment surface facing in the direction opposite to said first-named direction,
    the end regions of said expanding ring means being provided with abutment surface means, the planes of which subtend with one another such an angle that the abutment forces acting against said expanding ring means have an inwardly directed resultant,
    said expanding ring means being provided at both end regions thereof with one single abutment surface means for each direction of rotation, which is effective only in the respective direction, one abutment surface means being operable to enter into connection exclusively with the friction ring means and the other abutment surface means exclusively with the hub portion.

3. A synchronization installation for change-speed transmissions, especially for motor vehicles, having a hub portion supporting thereon the synchronization installation, comprising:
  friction ring means having a slot aperture,
    unitary slotted expanding ring means arranged within said friction ring means to increase the servo effect thereof and extending approximately over the entire length of said friction ring means,
    said expanding ring means having end regions which, in the operating position thereof, abut directly, on the one hand, against the end of said friction ring means pointing in the direction of rotation and, on the other, against an abutment surface provided in said hub portion, said abutment surface facing in the direction opposite to said first-named direction,
    the end regions of said expanding ring means being provided with abutment surface means, the planes of which subtend with one another such an angle that the abutment forces acting against said expanding ring means have an inwardly directed resultant,
    said hub portion being provided with an aperture,
    said expanding ring means having an inwardly directed nose portion comprising one of said abutment surface means and protruding into said aperture of said hub portion, said expanding ring means further having an outwardly directed nose portion comprising another of said abutment surface means and protruding into said slot aperture of said friction ring means.

4. A synchronization installation for change-speed transmissions, especially for motor vehicles, having a hub portion supporting thereon the synchronization installation, comprising:
  slotted friction ring means,
    unitary slotted expanding ring means arranged within said friction ring means to increase the servo effect thereof and extending approximately over the entire length of said friction ring means,
    said expanding ring means having end regions which, in the operating position thereof, abut directly, on the one hand, against the end of said friction ring means pointing in the direction of rotation and, on the other, against an abutment surface provided in said hub portion, said abutment surface facing in the direction opposite to said first named direction,
    the end regions of said expanding ring means being provided with abutment surface means, the planes of which subtend with one another such an angle that the abutment forces acting against said expanding ring means have an inwardly directed resultant,
    the slotted expanding ring means having a cross section that varies over the circumference thereof.

5. A synchronization installation for change-speed transmissions, especially for motor vehicles, having a hub portion supporting thereon the synchronization installation, comprising:
  slotted friction ring means,
    unitary slotted expanding ring means arranged within said friction ring means to increase the servo effect thereof and extending approximately over the entire length of said friction ring means,
    said expanding ring means having end regions which, in the operating position thereof, abut directly, on the one hand, against the end of said friction ring means pointing in the direction of rotation and, on the other, against an abutment surface provided in said hub portion, said abutment surface facing in the direction opposite to said first-named direction,
    the end regions of said expanding ring means being provided with abutment surface means, the planes of which subtend with on another such an angle that the abutment forces acting against said expanding ring means have an inwardly directed resultant,
    the slotted expanding ring means having a substantially flat cross section the long cross-sectional axis of which is disposed in the plane determined by the annular surface.

6. A synchronization installation for change-speed transmissions, especially for motor vehicles, having a hub portion supporting thereon the synchronization installation, comprising:
  friction ring means having a slot aperture,
    unitary slotted expanding ring means arranged within said friction ring means to increase the servo effect thereof and extending approximately over the entire length of said friction ring means,
    said expanding ring means having end regions which, in the operating position thereof, abut directly, on the one hand, against the end of said friction ring means pointing in the direction of rotation, and, on the other, against an abutment surface provided in said hub portion, said abutment surface facing in the direction opposite to said first-named direction,
    the end regions of said expanding ring means being provided with abutment surface means, the planes of which subtend with one another such an angle that the abutment forces acting against said expanding ring means have an inwardly directed resultant,
    said expanding ring means being provided at both end regions thereof with one single abutment surface means for each direction of rotation, which is effective only in the respective direction, one abutment surface means being operable to enter into connection exclusively with the friction ring means and the other abutment surface means exclusively with the hub portion,
    said hub portion being provided with an aperture,
    said expanding ring means having an inwardly directed nose portion comprising one of said abutment surface means and protruding into said aperture of said hub portion, said expanding ring means further having an outwardly directed nose portion comprising another of said abutment surface means and protruding into said slot aperture of said friction ring means.

7. A synchronization installation for change-speed transmissions, comprising:
  hub means,
  slotted friction ring means on said hub means,
  slotted expanding ring means arranged on said hub means and within said friction ring means to increase the servo effect thereof, said expanding ring means having abutment surface means in end regions thereof which in the operating position abut directly, on the one hand, against the end of said friction ring means pointing in the direction of rotation and, on the other, against an abutment surface in said hub means, said abutment surface facing in the direction opposite to said first-named direction, the planes of said abutment surface means subtending with one another such an angle that the abutment forces acting against said expanding ring means produce an inwardly directed resultant force.

8. A synchronization installation for change-speed transmissions, especially for motor vehicles, having a hub portion supporting thereon the synchronization installation, comprising:

slotted friction ring means, unitary slotted expanding ring means arranged within said friction ring means to increase the servo effect thereof and extending approximately over the entire length of said friction ring means, said expanding ring means having end regions which, in the operating position thereof, abut directly, on the one hand, against the end of said friction ring means pointing in the direction of rotation and, on the other, against an abutment surface provided in said hub portion, said abutment surface facing in the direction opposite to said first-named direction, the end regions of said expanding ring means being provided with abutment surface means, the planes of which subtend with one another such an angle that the abutment forces acting against said expanding ring means have an inwardly directed resultant, the two abutment surface means being respectively arranged, on the one hand, at an inwardly directed nose portion of said expanding ring means engaging into an aperture provided in the hub portion and, on the other, at an outwardly directed nose portion of said expanding ring means extending between the slot aperture of the friction ring means, the slotted expanding ring means having a cross section that varies over the circumference thereof.

9. A synchronization installation for change-speed transmissions, especially for motor vehicles, having a hub portion supporting thereon the synchronization installation, comprising:

slotted friction ring means, unitary slotted expanding ring means arranged within said friction ring means to increase the servo effect thereof and extending approximately over the entire length of said friction ring means, said expanding ring means having end regions which, in the operating position thereof, abut directly, on the one hand, against the end of said friction ring means pointing in the direction of rotation and, on the other, against an abutment surface provided in said hub portion, said abutment surface facing in the direction opposite to said first-named direction, the end regions of said expanding ring means being provided with abutment surface means, the planes of which subtend with one another such an angle that the abutment forces acting against said expanding ring means have an inwardly directed resultant, the two abutment surface means being respectively arranged, on the one hand, at an inwardly directed nose portion of said expanding ring means engaging into an aperture provided in the hub portion and, on the other, at an outwardly directed nose portion of said expanding ring means extending between the slot aperture of the friction ring means, the slotted expanding ring means having a substantially flat cross section the long cross-sectional axis of which is disposed in the plane determined by the annular surface.

10. A synchronization installation for change-speed transmissions, especially for motor vehicles, having a hub portion supporting thereon the synchronization installation and comprising:

slotted friction ring means, a plurality of similar slotted expanding ring means arranged axially adjacent one another within said friction ring means to increase the servo effect thereof and extending approximately over the entire length of said friction ring means, said expanding ring means having end regions which, in the operating position thereof, abut directly, on the one hand, against the end of said friction ring means pointing in the direction of rotation and, on the other, against an abutment surface provided in said hub portion, said abutment surface facing in the direction opposite to said first-named direction.

the end regions of said expanding ring means being provided with abutment surface means the planes of which subtend with one another such an angle that the abutment forces acting against said expanding ring means have an inwardly directed resultant.

11. A synchronization installation for change-speed transmissions, especially for motor vehicles, having a hub portion supporting thereon the synchronization installation and comprising:

slotted friction ring means, a plurality of similar slotted expanding ring means arranged axially adjacent one another within said friction ring means to increase the servo effect thereof and extending approximately over the entire length of said friction ring means, said expanding ring means having end regions which, in the operating position thereof, abut directly, on the one hand, against the end of said friction ring means pointing in the direction of rotation and, on the other, against an abutment surface provided in said hub portion, said abutment surface facing in the direction opposite to said first-named direction, the end regions of said expanding ring means being provided with abutment surface means the planes of which subtend with one another such an angle that the abutment forces acting against said expanding ring means have an inwardly directed resultant, at least two similar expanding ring means being arranged alternate with respect to one another.

12. A synchronization installation for change-speed transmissions, especially for motor vehicles, having a hub portion supporting thereon the synchronization installation and comprising:

slotted friction ring means, a plurality of similar slotted expanding ring means arranged axially adjacent one another within said friction ring means to increase the servo effect thereof and extending approximately over the entire length of said friction ring means, said expanding ring means having nose portions in the end regions which, in the operating position thereof, abut directly, on the one hand, against the end of said friction ring means pointing in the direction of rotation and, on the other, against an abutment surface provided in said hub portion, said abutment surface facing in the direction opposite to said first-named direction, the end regions of said expanding ring means being provided with abutment surface means the planes of which subtend with one another such an angle that the abutment forces acting against said expanding ring means have an inwardly directed resultant, at least two similar expanding ring means being arranged alternate with respect to one another, the hub portion being provided with two apertures offset in the direction of rotation, and an inwardly directed nose portion of those expanding ring means engaging into said offset apertures which are operable in one direction, whereas the outwardly directed nose portions of all expanding ring means extend between the slot aperture of the friction ring means.

13. A synchronization installation for change-speed transmissions, especially for motor vehicles, having a hub portion supporting thereon the synchronization installation and comprising:

slotted friction ring means, a plurality of similar slotted expanding ring means arranged axially adjacent one another within said friction ring means to increase the servo effect thereof and extending approximately over the entire length of said friction ring means, said expanding ring means having nose portions in the end regions which, in the operating position thereof, abut directly, on the one hand, against the end of said friction ring means pointing in the direction of rotation and, on the other, against an abutment surface provided in said hub portion, said abutment surface facing in the direction opposite to said first-named direction, the end regions of said expanding ring means being provided with abutment surface means the planes of which subtend with one another such an angle that the abutment forces acting against said expanding ring means have an inwardly directed resultant, at least two similar expanding ring means being arranged alternate with respect to one another, the hub portion being provided with two apertures offset in the direction of rotation, and an inwardly directed nose portion of those expanding ring means engaging into said offset apertures which are operable in one direction, whereas the outwardly directed nose portions of all expanding ring means extend between the slot aperture of the friction ring means, the slot aperture of the expanding ring means having a width which enables a compression of the expanding ring means through an angle of rotation that corresponds to the maximum permissive expansion of a second alternately arranged expanding ring means.

14. A synchronization installation for change-speed transmissions, especially for motor vehicles, having a hub portion supporting thereon the synchronization installation and comprising:

slotted friction ring means, a plurality of similar slotted expanding ring means arranged axially adjacent one another within said friction ring means to increase the servo effect thereof and extending approximately over the entire length of said friction ring means, said expanding ring means having end regions which, in the operating position thereof, abut directly, on the one hand, against the end of said friction ring means pointing in the direction of rotation and, on the other, against an abutment surface provided in said hub portion, said abutment surface facing in the direction opposite to said first-named direction, the end regions of said expanding ring means being provided with abutment surface means the planes of which subtend with one another such an angle that the abutment forces acting against said expanding ring means have an inwardly directed resultant, at least two similar expanding ring means being arranged alternate with respect to one another, the slot aperture of the expanding ring means having a width which enables a compression of the expanding ring means through an angle of rotation that corresponds to the maximum permissive expansion of a second alternately arranged expanding ring means.

15. A synchronization installation for change-speed transmissions, especially for motor vehicles, having a hub portion supporting thereon the synchronization installation and comprising:

slotted friction ring means, a plurality of similar slotted expanding ring means arranged axially adjacent one another within said friction ring means to increase the servo effect thereof and extending approximately over the entire length of said friction ring means, said expanding ring means having end regions which, in the operating position thereof, abut directly, on the one hand, against the ends of said friction ring means pointing in the direction of rotation and, on the other, against an abutment surface provided in said hub portion, said abutment surface facing in the direction opposite to said first-named direction, the end regions of said expanding ring means being provided with abutment surface means the planes of which subtend with one another such an angle that the abutment forces acting against said expanding ring means have an inwardly directed resultant, the two abutment surface means being respectively arranged, on the one hand, at an inwardly directed nose portion of said expanding ring means engaging into an aperture of the hub portion and, on the other, at an outwardly directed nose portion of said expanding ring means extending between the slot aperture of the friction ring means, at least two similar expanding ring means being arranged alternate with respect to one another, the slot aperture of the expanding ring means having a width which enables a compression of the expanding ring means through an angle of rotation that corresponds to the maximum permissive expansion of a second alternately arranged expanding ring means.

16. A synchronization installation for change-speed transmissions, especially for motor vehicles, having a hub portion supporting thereon the synchronization installation and comprising:

slotted friction ring means, a plurality of similar slotted expanding ring means arranged axially adjacent one another within said friction ring means to increase the servo effect thereof and extending approximately over the entire length of said friction ring means, said expanding ring means having nose portions in the end regions which, in the operating position thereof, abut directly, on the one hand, against the end of said friction ring means pointing in the direction of rotation and, on the other, said abutment surface facing in the direction opposite to said first-named direction, against an abutment surface provided in said hub portion, the end regions of said expanding ring means being provided with abutment surface means the planes of which subtend with one another such an angle that the abutment forces acting against said expanding ring means have an inwardly directed resultant, said expanding ring means being provided at both end regions thereof with one single abutment surface means for each direction of rotation which is effective only in the respective direction, one abutment surface means being operable to enter into connection exclusively with the friction ring means and the other exclusively with the hub portion, the two abutment surface means being respectively arranged, on the one hand, at an inwardly directed nose portion of said expanding ring means engaging into an aperture of the hub portion and, on the other, at an outwardly directed nose portion of said expanding ring means extending between the slot aperture of the friction ring means, at least two similar expanding ring means being arranged alternate with respect to one another, the hub portion being provided with two apertures offset in the direction of rotation, and an inwardly directed nose portion of those expanding ring means engaging into said offset apertures which are operable in one direction, where as the outwardly directed nose portions of all expanding ring means extend between the slot aperture of the friction ring means, the slot aperture of the expanding ring means having a width which enables a compression of the expanding ring means through an angle of rotation that corresponds to the maximum permissive expansion of a second alternately arranged expanding ring means.

17. A synchronization installation for change-speed transmissions, especially for motor vehicles, having a shifting sleeve, and comprising:

hub means, slotted friction ring means on said hub means, slotted expanding ring means arranged between said hub means and said friction ring means to increase the servo effect thereof, and means including abutment surface means on said expanding ring means abutting directly, on the one hand, against the end of said friction ring means pointing in the direction of rotation and, on the other, against an abutment surface in said hub means, said abutment surface facing in the direction opposite to said first-named direction, said abutment surface means and said abutment surface subtending an angle with respect to each other to prevent complete abutment immediately of said expanding ring means over the entire circumference thereof against the internal surface of said friction ring means so as to enable compression of the ends of said friction ring means upon attaining synchronism when displacing said shifting sleeve for the engagement of the next speed, and further means for rendering the synchronization installation operable with different effectiveness in opposite directions of rotation, and still further means in said synchronization installation for controlling the maximum expansion of said expansion ring means.

References Cited by the Examiner

UNITED STATES PATENTS 3,110,382  11/1963  Jones _____ 192

FOREIGN PATENTS 1,346,800  2/1963  France.

DAVID J. WILLIAMOWSKY, *Primary Examiner.*